(12) United States Patent
Lando et al.

(10) Patent No.: US 9,730,396 B2
(45) Date of Patent: Aug. 15, 2017

(54) HORTICULTURAL POT AND TRAY FILLING APPARATUS

(71) Applicant: Agrinomix, LLC, Oberlin, OH (US)

(72) Inventors: Robert N. Lando, Avon, OH (US); George L. Andulics, Lorain, OH (US); Joseph G. Smith, Vermilion, OH (US); Charles M. Kirschner, Strongsville, OH (US); David W. Joy, West Salem, OH (US)

(73) Assignee: Agrinomix, LLC, Oberlin, OH (US)

( * ) Notice: Subject to any disclaimer, the term of this patent is extended or adjusted under 35 U.S.C. 154(b) by 204 days.

(21) Appl. No.: 14/752,436

(22) Filed: Jun. 26, 2015

(65) Prior Publication Data

US 2015/0373925 A1    Dec. 31, 2015

Related U.S. Application Data

(60) Provisional application No. 62/018,021, filed on Jun. 27, 2014.

(51) Int. Cl.
*A01G 9/08*     (2006.01)

(52) U.S. Cl.
CPC ................... *A01G 9/081* (2013.01)

(58) Field of Classification Search
CPC ........... A01C 11/00; A01G 9/08; A01G 9/081
(Continued)

(56) References Cited

U.S. PATENT DOCUMENTS 2,771,709 A * 11/1956 Ritter ................ A01G 9/081
                                                    111/100
2,884,022 A *  4/1959 Geary ................ A01G 9/081
                                                    141/190
(Continued)

OTHER PUBLICATIONS

"131 Pro Flat and Pot Filling System." 2014 Bouldin & Lawson, LLC, http://bouldinlawson.com/131-pro-filler/, 1 page.

*Primary Examiner* — Timothy L Maust
*Assistant Examiner* — Andrew Schmid
(74) *Attorney, Agent, or Firm* — Eschweiler & Potashnik, LLC

(57) ABSTRACT

A horticultural container filling apparatus has a hopper to selectively dispense soil through an exit. A two-tier strip conveyor assembly has a plurality of narrow conveyor belts coupled to a motor for translating the narrow conveyor belts in a first direction along a first plane below the exit of the hopper. The narrow conveyor belts spaced apart, defining one or more gaps. A plurality of support rails support and guide the narrow conveyor belts along the first plane and are configured to support and convey a container on the narrow conveyor belts in the first direction. The container receives a portion of the soil dispensed from the exit of the hopper, and the gaps pass a remaining portion of soil not received by the container to a second plane below the first plane. A catch conveyor belt along the second plane receives and translates the remaining portion of soil in a second direction along the second plane. A return conveyor assembly has one or more inclined conveyor belts for receiving the remaining portion of the soil from the catch conveyor belt returns the remaining portion to the hopper. The inclined conveyor belts are substantially flat belts, and an incline angle of the inclined conveyor belts is configured to generally prevent slippage of the remaining portion of the potting material.

20 Claims, 15 Drawing Sheets

(58) Field of Classification Search
USPC ....... 141/129, 130, 131, 132, 133, 134, 135,
141/153, 154, 155, 156; 47/1.01 P
See application file for complete search history.

(56) References Cited

U.S. PATENT DOCUMENTS

| | | | | |
|---|---|---|---|---|
| 3,365,840 | A * | 1/1968 | Cooper | A01G 11/00 47/59 R |
| 4,020,881 | A * | 5/1977 | Nothen | A01G 9/081 141/1 |
| 4,363,341 | A * | 12/1982 | Powell | A01G 9/081 141/183 |
| 5,641,008 | A * | 6/1997 | Ellis | A01G 9/081 141/129 |
| 6,594,949 | B2 | 7/2003 | Ellis | |
| 2003/0070352 | A1* | 4/2003 | Ellis | A01C 11/00 47/1.01 P |
| 2003/0106258 | A1* | 6/2003 | Keller | A01C 7/042 47/1.01 P |
| 2010/0006607 | A1* | 1/2010 | Morse | A01G 9/108 222/544 |
| 2012/0285580 | A1* | 11/2012 | Ellis | A01G 9/081 141/1 |
| 2013/0255144 | A1* | 10/2013 | Lansdale | A01B 77/00 47/1.42 |
| 2015/0373925 | A1* | 12/2015 | Lando | A01G 9/081 47/1.01 P |

* cited by examiner

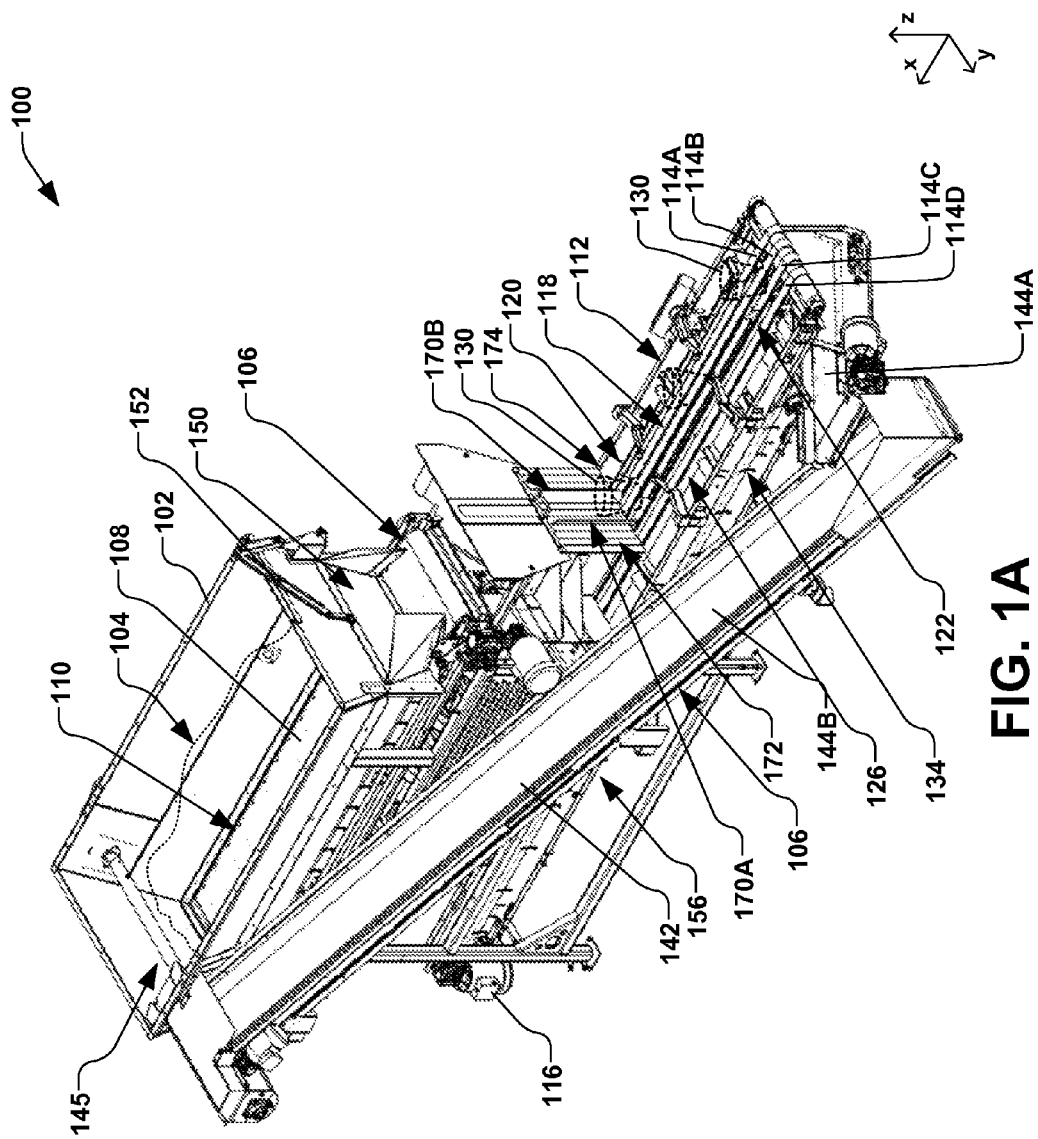

HORTICULTURAL POT AND TRAY FILLING APPARATUS

REFERENCE TO RELATED APPLICATION

This application claims priority to and the benefit of U.S. Provisional Application Ser. No. 62/018,021 which was filed Jun. 27, 2014, entitled "HORTICULTURAL POT AND TRAY FILLING APPARATUS", the entirety of which is hereby incorporated by reference as if fully set forth herein.

TECHNICAL FIELD

The present disclosure relates generally to horticultural potting systems, and more specifically to a system, apparatus, and method for efficiently filling pots and plant trays with material and recovery of material associated therewith.

BACKGROUND

In the horticultural industry, growers and nurseries periodically transplant growing plants (e.g., seedlings, flowers, young trees, shrubs, etc.) into pots of increased size in order to accommodate future growth. Once the plants have grown to a desired size, the potted plants can be sold or otherwise transferred to retail nurseries, landscape companies or the like for transplanting to a permanent site.

Growers often employ container filling machines, or so-called potting machines, to fill horticultural containers or planting pots with soil in order to receive seedlings or other growing plants that are ready for transplanting. Conventional potting machines automate the filling of the horticultural containers (e.g., pots, trays, or other containers) with soil by passing the horticultural containers on a conveyor belt under a filling location, whereby soil is gravity-fed into the horticultural containers. Subsequently, the soil is leveled in the pot by scraping or lightly pressing the soil, and the filled pot may be removed from the conveyor. Alternatively, the pot is delivered by the conveyor to a hole-drilling station, whereby a hole is drilled in the middle of the filled pot in order to receive the seedling or young plant. Once planted, the horticultural containers including the newly transplanted plants can be removed from the conveyor belt for transport to a new location.

Conventional potting machines typically employ a bucket conveyor, soil chain elevator using chains and sprockets, or auger which transfers potting soil from a soil supply to the substantially higher filling location, whereby the bucket conveyor or auger elevates and transfers the soil over and into the horticultural containers travelling along the conveyor belt. However, such conventional potting machines employing bucket conveyors or chain elevators often experience difficulties in adequately feeding soils to the horticultural containers based on the consistency of the soil. For example, soils having varying quantities of sand, bark, mulch, or other materials can clog, jam, or otherwise hinder the operation of the bucket conveyor or auger, thus leading to inconsistent filling of the horticultural containers. Since the bucket conveyor is often travelling downward at the region where the bucket conveyor picks up the soil, the bucket conveyor has a tendency to jam due, at least in part, to the variations in the soil consistency. When a jam occurs, the machine potting is shut down until the jam is rectified, thereby decreasing production associated with the machine. Further, as a consequence, these conventional pot filling machines often require substantial maintenance, as they are often prone to failure.

SUMMARY

The present disclosure overcomes the limitations of the prior art by providing a compact horticultural container filling apparatus for filling horticultural pots and trays in an efficient manner. Accordingly, the following presents a simplified summary of the disclosure in order to provide a basic understanding of some aspects of the disclosure. This summary is not an extensive overview of the disclosure. It is intended to neither identify key or critical elements of the disclosure nor delineate the scope of the invention. Its purpose is to present some concepts of the disclosure in a simplified form as a prelude to the more detailed description that is presented later.

In accordance with one exemplary aspect of the disclosure, a horticultural container filling apparatus is provided, wherein a hopper is configured to selectively dispense potting material through an exit thereof. The potting material, for example, can comprise potting soil and/or other materials used in filling containers in horticultural industries. According to one example, a two-tier strip conveyor assembly is provided having a plurality of narrow conveyor belts that are operably coupled to a rotational input device. The rotational input device, for example, is configured to translate the plurality of narrow conveyor belts in a first direction along a first plane in a conveying region below the exit of the hopper. The plurality of narrow conveyor belts, for example, are respectively spaced a predetermined distance from one another, therein defining one or more gaps between the plurality of narrow conveyor belts.

The two-tier strip conveyor assembly, for example, further comprises a plurality of support rails, wherein the plurality of support rails are configured to support and guide the plurality of narrow conveyor belts along the first plane. The plurality of narrow conveyor belts, in conjunction with the plurality of support rails, are configured to support and convey a horticultural container disposed thereon in the first direction in the conveying region. The horticultural container, for example, is configured to receive at least a portion of the potting material dispensed from the exit of the hopper, wherein the one or more gaps between the plurality of narrow conveyor belts are configured to pass a remaining portion of the potting material that is not received by the horticultural container through to a second plane positioned below the first plane.

A catch conveyor belt having a catch region is further provided and positioned along the second plane. The catch conveyor is thus configured to receive and translate the remaining portion of the potting material that has passed through the one or more gaps in a second direction along the second plane. In one example, the first plane and second plane are generally parallel, wherein the first direction and second direction are generally opposite one another.

Further, a return conveyor assembly is further provided one or more inclined conveyor belts are provided and configured to receive the remaining portion of the potting material from the catch conveyor belt and to return the remaining portion of the potting material to the hopper. The one or more inclined conveyor belts, for example, are comprised of one or more substantially flat belts, and wherein an incline angle of the one or more inclined conveyor belts is configured to generally prevent slippage of the remaining portion of the potting material, while elevating and releasing the remaining portion of the potting material back into the hopper for filling of subsequent horticultural containers. The plurality of narrow conveyor belts and one or more inclined conveyor belts, for example, comprise flat conveyor belts. The plurality of narrow conveyor belts and one or more inclined conveyor belts have no scoops or buckets, as seen in conventional pot filling machines, thereby minimizing jamming of material.

According to one example, the one or more inclined conveyor belts comprise a first inclined conveyor belt and a second inclined conveyor belt. The first inclined conveyor belt, for example, is configured to receive the remaining portion of the potting material from the catch conveyor belt and to translate the remaining portion of the potting material in a third direction transverse to at least the second direction. The second inclined conveyor belt is further configured to receive the remaining portion of the potting material from the first inclined conveyor belt and to translate and elevate the remaining portion of the potting material to be returned back to the hopper.

In another example, one or more of the plurality of support rails comprise a slide bed top, wherein the plurality of narrow conveyor belts slidingly engage one or more of the respective plurality of support rails via the slide bed top. Further, one or more of the plurality of support rails can comprise a V-shaped groove. As such, one or more of the plurality of narrow conveyor belts further comprises a tracking strip positioned on an underside thereof, wherein the respective tracking strip is configured to slidingly engage the respective V-shaped groove, therein maintaining a tracking of the respective narrow conveyor belt along the first direction.

One or more clean-off plows can be further provided, wherein the one or more clean-off plows are associated with an under side of each support rail and are configured to contact an underside surface of the plurality of narrow conveyor belts. The one or more clean-off plows are thus configured to wipe residual potting material from the underside surface of the plurality of narrow conveyor belts, therein maintaining adequate contact and tracking of the plurality of narrow conveyor belts.

A material agitator can be further associated with the plurality of narrow conveyor belts, wherein the material agitator is configured to agitate the potting material in the horticultural container to order to induce settling and uniformity of the potting material within the horticultural container. One or more of a compaction roller and a brush-off unit may be further provided, wherein the compaction roller is positioned a first predetermined distance above the first plane and is configured to provide downward pressure onto the potting material deposited in the horticultural container. The brush-off unit may be positioned a second predetermined distance above the first plane, whereby the brush-off unit is configured to brush excess potting material from the horticultural container. The brush-off unit may be powered via a brush-off actuator configured to forcefully brush a predetermined amount of potting material from the container. The compaction roller may be passive and free to rotate.

In accordance with another aspect of the disclosure, one or more of the material agitator, compaction roller, and brush-off unit are individually vertically adjustable. For example, one or more of the material agitator, compaction roller, and brush-off unit are individually vertically adjustable via a scissor jack operably coupled to a position leveling apparatus. Strip-mounted rack gears, for example, may be further provided and configured to level and support the respective one or more of the material agitator, compaction roller, and brush-off unit.

According to another example, first and second filling plates are positioned proximate to the exit of the hopper, wherein the first and second filling plates are manually positionable and configured to guide the horticultural containers as they are filled with potting material. One or more manually-adjustable hinged guide wings may be mounted proximate to a mid-point of the respective first and second filling plates, wherein the one or more manually-adjustable hinged guide wings are configured to direct the potting material into the horticultural container. A dust cover extension may be further operably coupled to a front of a filling plate area associated with the first and second filling plates, wherein the dust cover is vertically adjustable and configured to contain potting material that may become airborne. The dust cover, for example, may comprise a manually-adjustable plastic extension curtain, wherein the manually-adjustable plastic extension curtain is magnetically coupled to a metallic rectangular frame within a top, stationary dust cover.

In another exemplary aspect, a discharge gate is associated with the exit of the hopper, wherein the discharge gate comprises a manual screw-drive operably coupled to hinged levers. The manual screw-drive, for example, is configured to open, close, or re-position the discharge gate via the hinged levers, therein further controlling a discharge of the potting material from the exit of the hopper.

It should be noted that above summary is intended to give a brief overview of some features of some embodiments of the present disclosure, and other embodiments may comprise additional and/or different features than the ones mentioned above. In particular, this summary is not to be construed to be limiting the scope of the present application. Thus, to the accomplishment of the foregoing and related ends, the disclosure comprises the features hereinafter described and particularly pointed out in the claims. The following description and the annexed drawings set forth in detail certain illustrative embodiments of the disclosure. These embodiments are indicative, however, of a few of the various ways in which the principles of the disclosure may be employed. Other objects, advantages and novel features of the disclosure will become apparent from the following detailed description of the disclosure when considered in conjunction with the drawings.

BRIEF DESCRIPTION OF THE DRAWINGS

FIG. 1A is a left perspective view of a container filling apparatus in accordance with several aspects of the present disclosure.

DETAILED DESCRIPTION

Figure 1B:
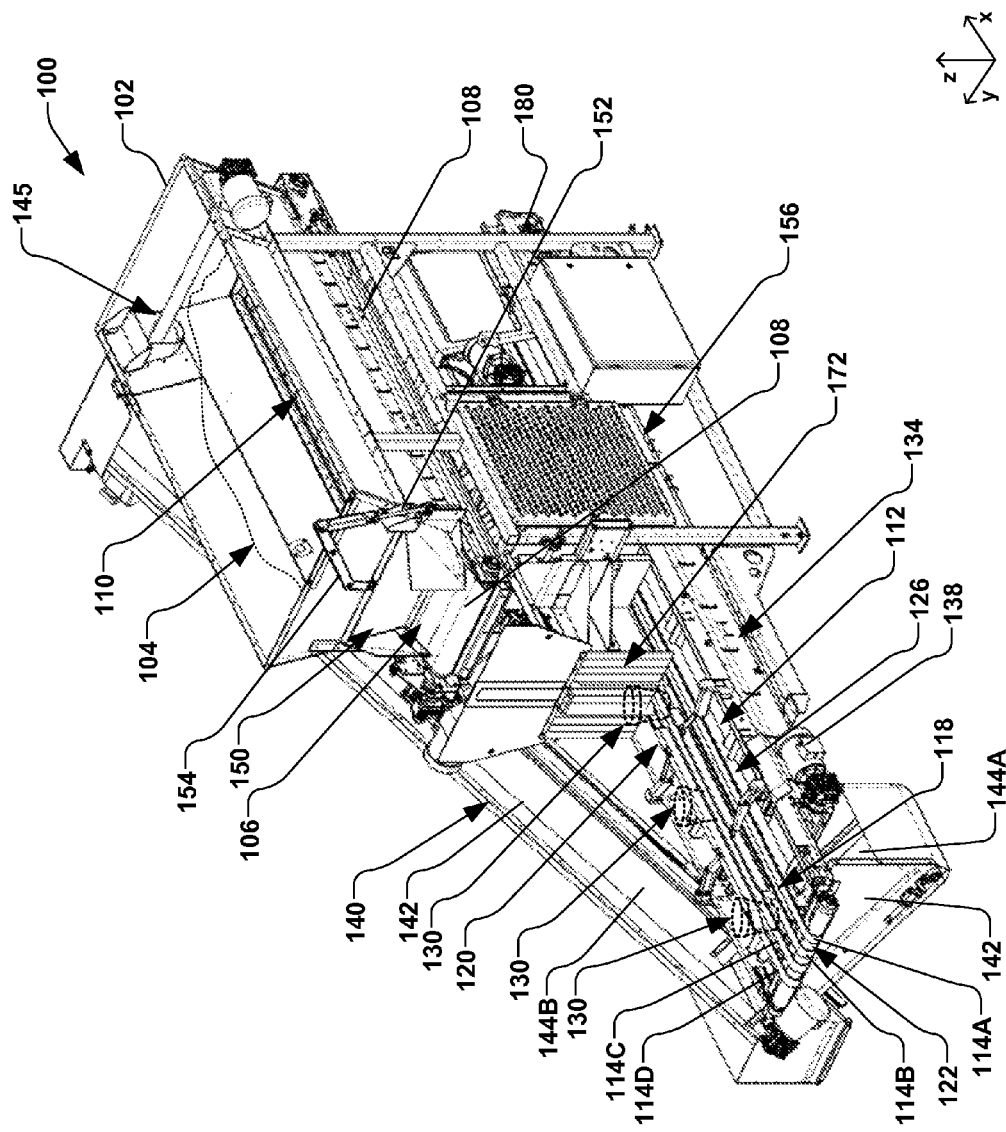
FIG. 1B is a right perspective view of the container filling apparatus of FIG. 1A in accordance with several aspects of the present disclosure.

The present disclosure is directed generally toward a system, apparatus, and method for efficiently filling horticultural containers and for efficiently recycling a soil medium utilized therein. Accordingly, the present disclosure will now be described with reference to the drawings, wherein like reference numerals may be used to refer to like elements throughout. It is to be understood that the description of these aspects are merely illustrative and that they should not be interpreted in a limiting sense. In the following description, for purposes of explanation, numerous specific details are set forth in order to provide a thorough understanding of the present disclosure. It will be evident to one skilled in the art, however, that the present disclosure may be practiced without these specific details. Further, the scope of the disclosure is not intended to be limited by the embodiments or examples described hereinafter with reference to the accompanying drawings, but is intended to be only limited by the appended claims and equivalents thereof.

It is also noted that the drawings are provided to give an illustration of some aspects of embodiments of the present disclosure and therefore are to be regarded as schematic only. In particular, the elements shown in the drawings are not necessarily to scale with each other, and the placement of various elements in the drawings is chosen to provide a clear understanding of the respective embodiment and is not to be construed as necessarily being a representation of the actual relative locations of the various components in implementations according to an embodiment of the disclosure. Furthermore, the features of the various embodiments and examples described herein may be combined with each other unless specifically noted otherwise.

It is also to be understood that in the following description, any direct connection or coupling between functional blocks, devices, components, circuit elements or other physical or functional units shown in the drawings or described herein could also be implemented by an indirect connection or coupling. Furthermore, it is to be appreciated that functional blocks or units shown in the drawings may be implemented as separate features or circuits in one embodiment, and may also or alternatively be fully or partially implemented in a common feature or circuit in another embodiment. For example, several functional blocks may be implemented as software running on a common processor, such as a signal processor. It is further to be understood that any connection which is described as being wire-based in the following specification may also be implemented as a wireless communication, unless noted to the contrary.

Referring now to the Figures, a horticultural container filling apparatus 100 is provided in FIGS. 1A and 1B in accordance with several exemplary aspects of the present disclosure. The horticultural container filling apparatus 100, for example, comprises a hopper 102, wherein the hopper is configured to selectively dispense potting material 104 (illustrated in phantom) through an exit 106 thereof. For example, a hopper conveyor 108 is provided along a bottom portion 110 of the hopper, wherein the hopper conveyor is configured to transfer the potting material 104 to the exit 106 thereof. The potting material 104, for example, can comprise potting soil and/or other materials used in filling containers in horticultural industries, such as soil containing various large or heavy particles (e.g., bark, compost, sand, stones, etc.) that are known to flow poorly.

According to one example, the horticultural container filling apparatus 100 further comprises a two-tier strip conveyor assembly 112, wherein the two-tier strip conveyor assembly comprises a plurality of narrow conveyor belts 114A-114D that are operably coupled to a first rotational input device 116 (e.g., an electric motor) illustrated in FIG. 1A. The first rotational input device 116, for example, is configured to translate the plurality of narrow conveyor belts 114A-114D in a first direction (e.g., the +x direction) along a first plane 118 in a conveying region 120 generally below the exit 106 of the hopper 102. The plurality of narrow conveyor belts 114A-114D, for example, are respectively spaced a predetermined distance from one another, therein defining one or more gaps 122 between the plurality of narrow conveyor belts, as illustrated in greater detail in FIGS. 2A, 3A, and 4.

The narrow conveyor belts 114A-114D in the present example are positioned such that the one or more gaps 122 therebetween is approximately two inches. It should be noted, however, that while four narrow conveyor belts 114 are described and illustrated, any number of narrow conveyor belts may be implemented, and are thus contemplated as falling within the scope of the present disclosure. Further, the material, size, and spacing of the narrow conveyor belts 114 may be selected based on a size and/or weight of the horticultural container 130 or various other considerations, such as the type of potting material 104, desired longevity, frictional properties, etc.

The two-tier strip conveyor assembly 112, for example, further comprises a plurality of support rails 124, wherein the plurality of support rails are configured to support and guide the plurality of narrow conveyor belts 114A-114D along the first plane 118. The plurality of support rails 124, for example, are illustrated in greater detail in FIGS. 2A-2B and 3A-3B, wherein FIGS. 2B and 3B illustrate the two-tier strip conveyor assembly 112 without the plurality of narrow conveyor belts 114A-114D for purposes of clarity. In one example, one or more of the plurality of support rails 124 comprise a slide bed top 126 shown in FIGS. 2A and 2B, wherein the plurality of narrow conveyor belts 114 slidingly engage one or more of the respective plurality of support rails via the slide bed top. Further, one or more of the plurality of support rails 124, such as illustrated in FIG. 2B can comprise a V-shaped groove 128. As such, one or more of the plurality of narrow conveyor belts 114A-114D of FIG. 2A, for example, further comprises a tracking strip 129 (e.g., illustrated in FIG. 5) positioned on an underside thereof, wherein the respective tracking strip is configured to slidingly engage the respective V-shaped groove 128 of FIG. 2B, therein maintaining a tracking of the respective narrow conveyor belt along the first direction.

Figure 2A:
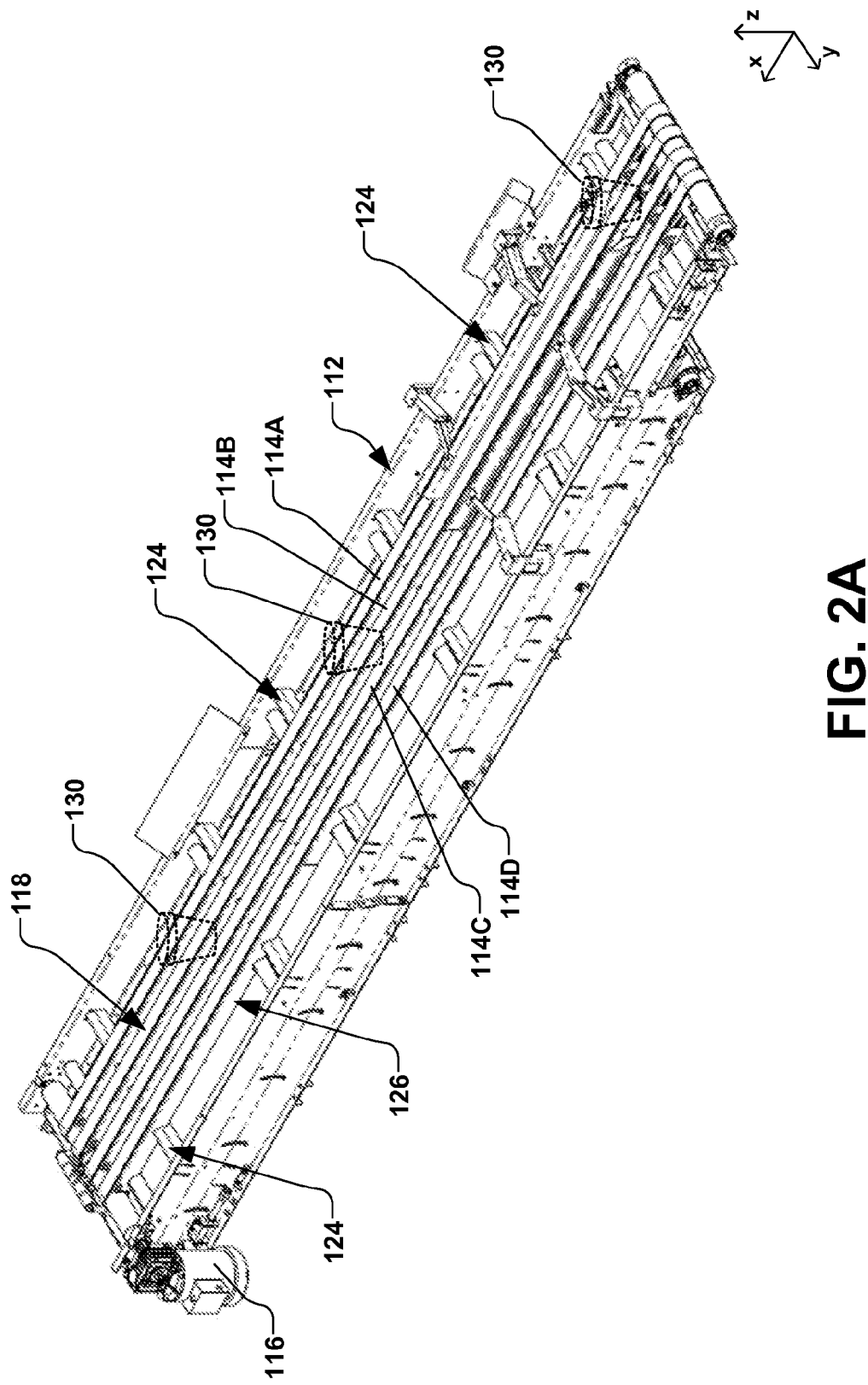
FIG. 2A is a top perspective view of a two-tier strip conveyor assembly having a plurality of narrow conveyor belts according several aspects.
Figure 2B:
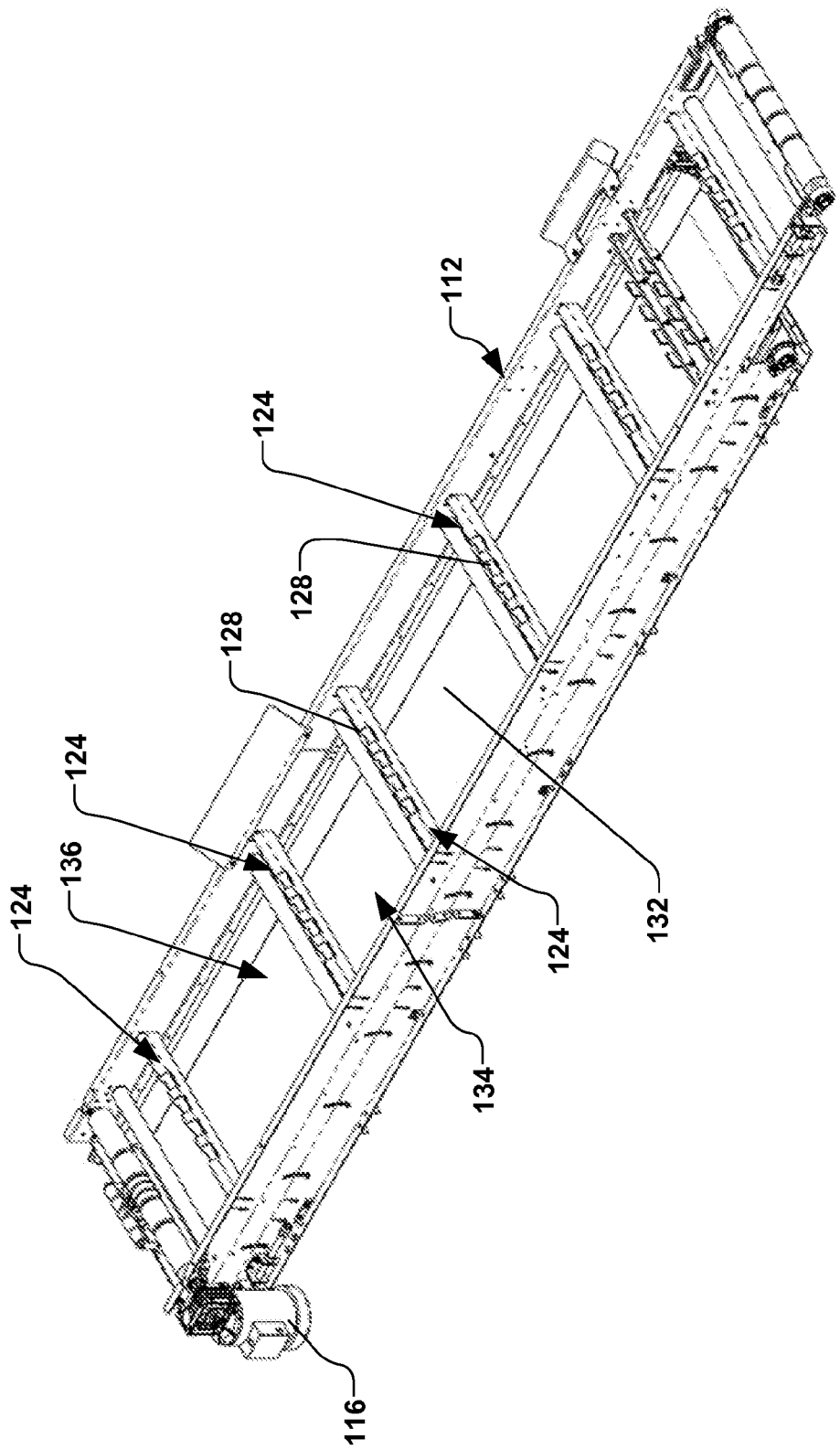
FIG. 2B is a top perspective view of the two-tier strip conveyor assembly of FIG. 2A with the plurality of narrow conveyor belts removed.
Figure 3A:
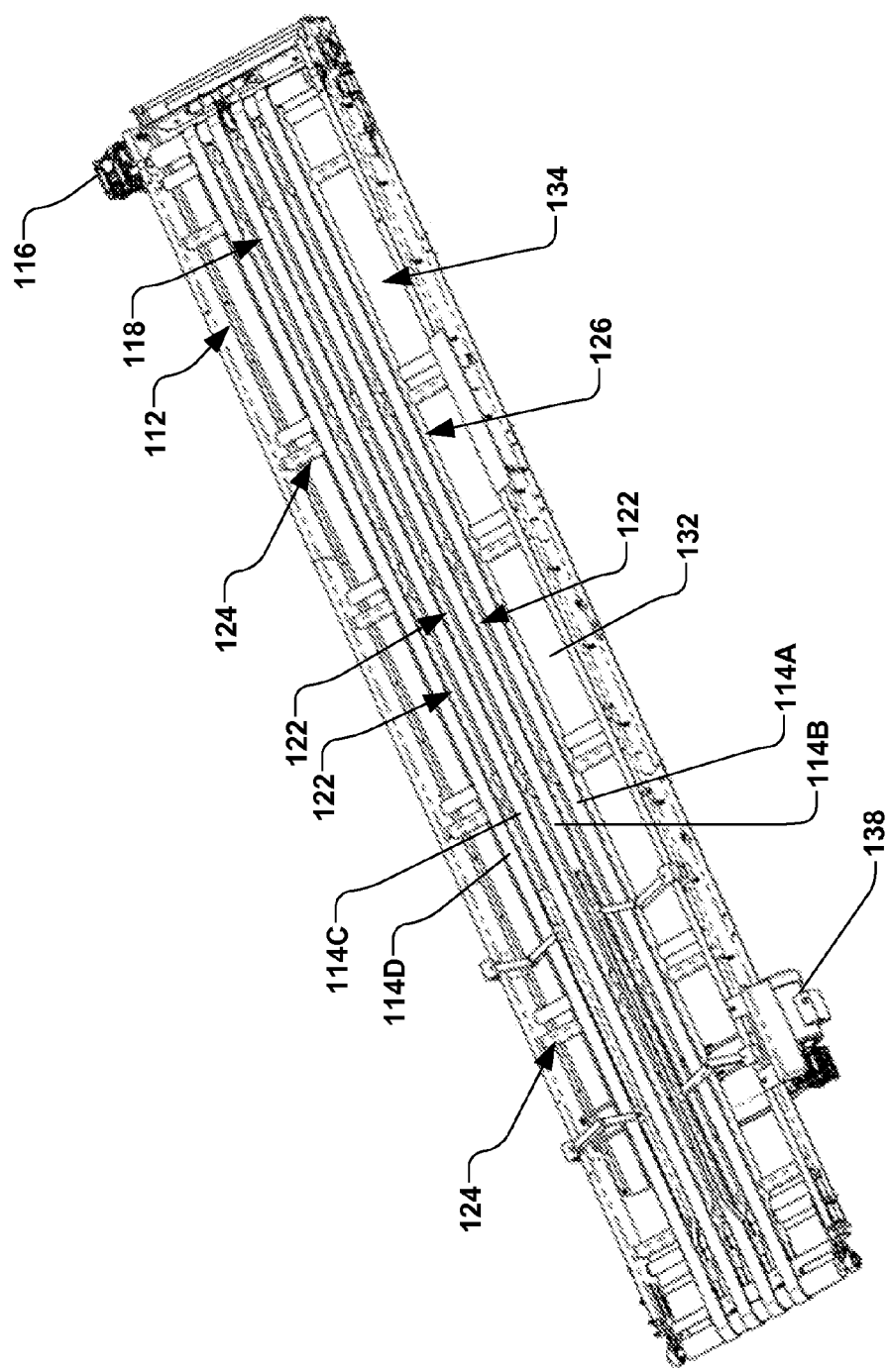
FIG. 3A is another top perspective view of the exemplary two-tier strip conveyor assembly of FIGS. 2A-2B.
Figure 3B:
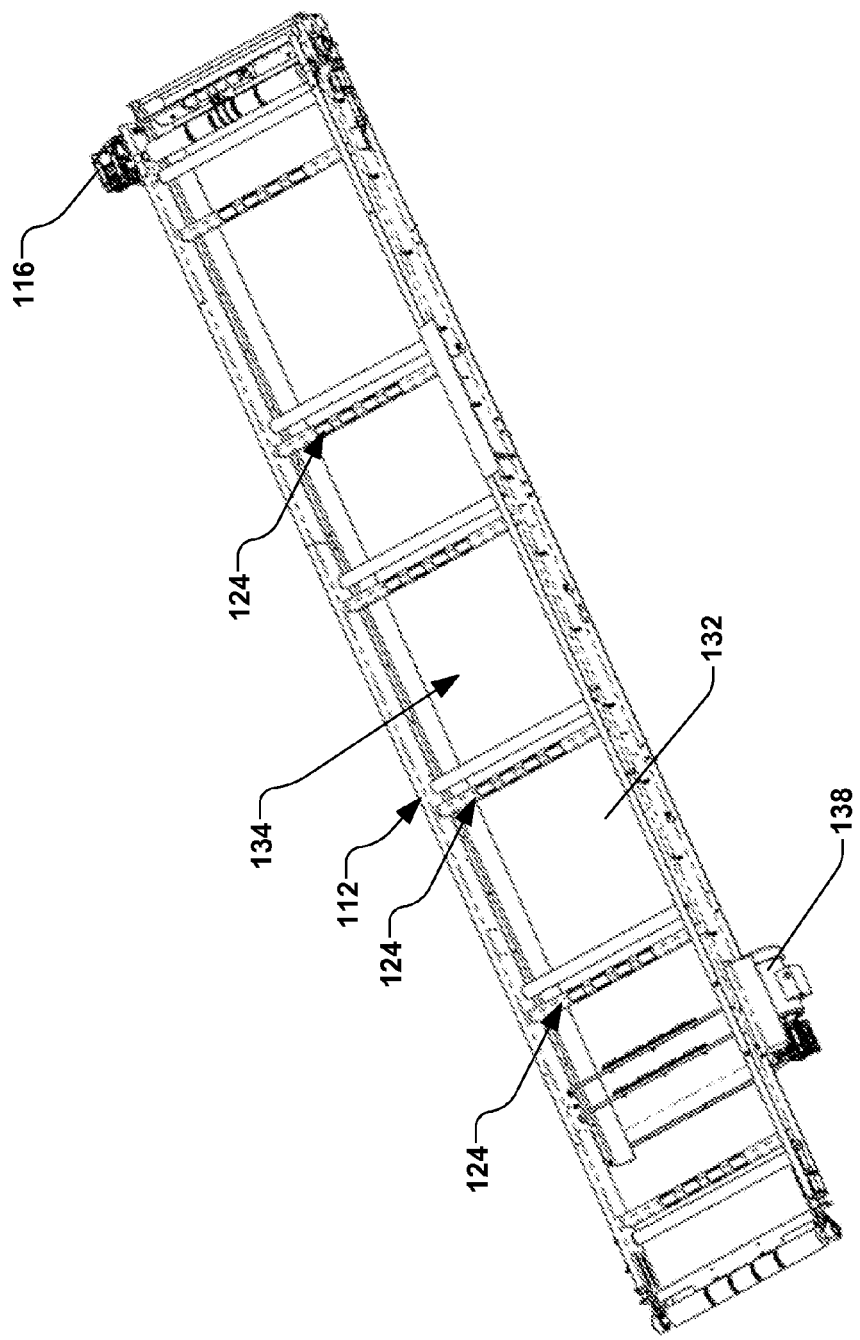
FIG. 3B is another top perspective view of the exemplary two-tier strip conveyor assembly of FIG. 3A with the plurality of narrow conveyor belts removed.

The plurality of narrow conveyor belts 114A-114D of FIGS. 2A and 3A, for example, in conjunction with the plurality of support rails 124, are configured to support and convey a horticultural container 130 (shown in phantom) disposed thereon in the first direction in the conveying region 120, as illustrated in FIGS. 1A-1B. The horticultural container 130, for example, is configured to receive at least a portion of the potting material 104 dispensed from the exit 106 of the hopper 102, wherein the one or more gaps 122 between the plurality of narrow conveyor belts 114A-114B are configured to pass a remaining portion of the potting material that is not received by the horticultural container through to a catch conveyor belt 132 positioned below the first plane 118 on a second plane 134, illustrated in greater detail in FIGS. 2B and 3B.

The catch conveyor belt 132, for example, comprises a catch region 136 illustrated in FIG. 3B positioned along the second plane 134, wherein the catch conveyor belt is thus configured to receive and translate the remaining portion of the potting material 104 that has passed through the one or more gaps 122. A second rotational input device 138 (e.g., an electric motor), for example, is further coupled to the catch conveyor belt 132, wherein the second rotational input device is configured to translate the catch conveyor belt in a second direction (e.g., the −x direction) along the second plane 134. In one example, the first plane 118 and second plane 134 are generally parallel, wherein the first direction and second direction are generally opposite one another.

In accordance with another exemplary aspect illustrated in FIGS. 1A-1B, a return conveyor assembly 140 is further provided, wherein one or more inclined conveyor belts 142 are configured to receive the remaining portion of the potting material 104 from the catch conveyor belt 132 and to return the remaining portion of the potting material to the hopper 102. The one or more inclined conveyor belts 142, for example, are comprised of one or more substantially flat belts 144A, 144B, and wherein an incline angle of the one or more inclined conveyor belts is configured to generally prevent slippage of the remaining portion of the potting material 104, while elevating and releasing the remaining portion of the potting material back into the hopper 102 for filling of subsequent horticultural containers 130. The plurality of narrow conveyor belts 114A-114D, catch conveyor belt 132, and one or more inclined conveyor belts 142, for example, comprise flat conveyor belts having no scoops or buckets, as seen in conventional pot filling machines, thereby minimizing jamming of potting material 104.

According to one example, the one or more inclined conveyor belts 142 comprise a first inclined conveyor belt 144A and a second inclined conveyor belt 144B. The first inclined conveyor belt 144A, for example, is configured to receive the remaining portion of the potting material 104 from the catch conveyor belt 132 and to translate the remaining portion of the potting material in a third direction (e.g., the +y direction) transverse to at least the second direction (e.g., the −x direction). The second inclined conveyor belt 144B, for example, is further configured to receive the remaining portion of the potting material 104 from the first inclined conveyor belt 144A and to translate and elevate the remaining portion of the potting material back to the hopper 102. For example, the second inclined conveyor belt 144B elevates the potting material 104 to an elevation 145 of the hopper 102. The potting material 104 may be gravity fed or otherwise mechanically fed into the hopper 102 at the elevation 145. The second inclined conveyor belt 144B, for example, may gravity feed the remaining portion of the potting material 104 into the hopper 102, or an additional conveyor, auger, or other transport mechanism (not shown) may be utilized.

In the present example, the plurality of narrow conveyor belts 114A-114D comprise four individual continuous strips or loops of rubber belting. For example, each strip of the plurality of narrow conveyor belts 114A-114D is approximately 2" inches wide, by ¼" inches thick. The narrow conveyor belts 114A-114D, for example, further span nearly the entire length of the horticultural container filling apparatus 100. As such, this enables excess potting material 104 to drop down through the one or more gaps 122 between the plurality of narrow conveyor belts 114A-114D to the catch conveyor belt 132 over almost the entire length of the horticultural container filling apparatus 100. As such, this permits a greater amount of potting material 104 to be returned without overloading the catch conveyor belt 132 or return conveyor assembly 140, and reduces the volume of excess potting material deposited all at once. It is again noted, however, that the size and number of narrow conveyor belts 114A-114D may be selected based on process requirements, and any values provided herein are not intended to limit the scope of the present disclosure.

Further, by translating the catch conveyor belt 132 in the opposite direction narrow conveyor belts 114A-114D, not only is more potting material permitted to return to the hopper 102 without overloading the system, but it also advantageously permits the one or more inclined conveyor belts 142 to operate on a more shallow angle, thus enabling the one or more inclined conveyor belts 142 to transfer large particles, and heavy or poor-flow soil mixes, such as bark or compost, up to the hopper without deleterious results. Conventional designs utilize augers or bucket elevators which require substantial maintenance and are prone to failure, especially when the potting material includes bark and sand.

Figure 4:
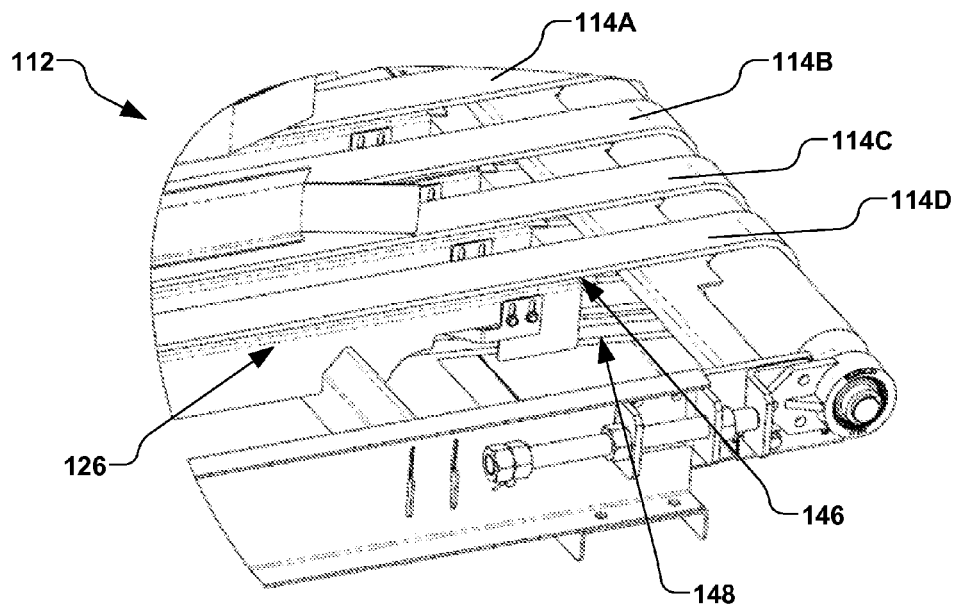
FIGS. 4-5 are perspective views of a narrow conveyor belts with a bottom plow in accordance with another exemplary aspect of the disclosure.
Figure 5:
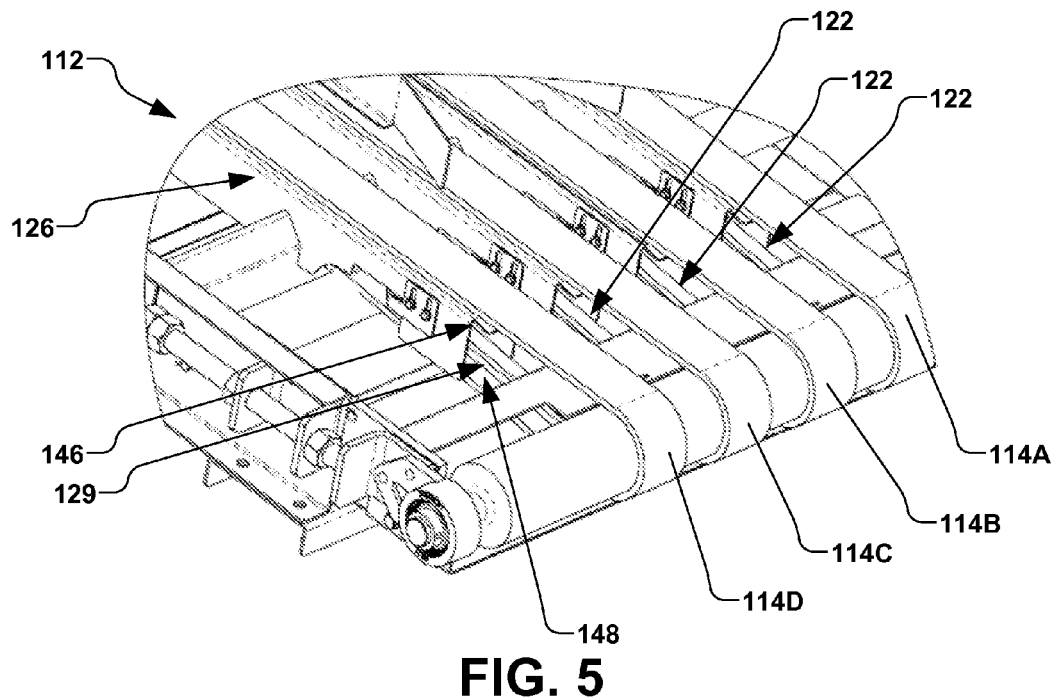
Figure 6:
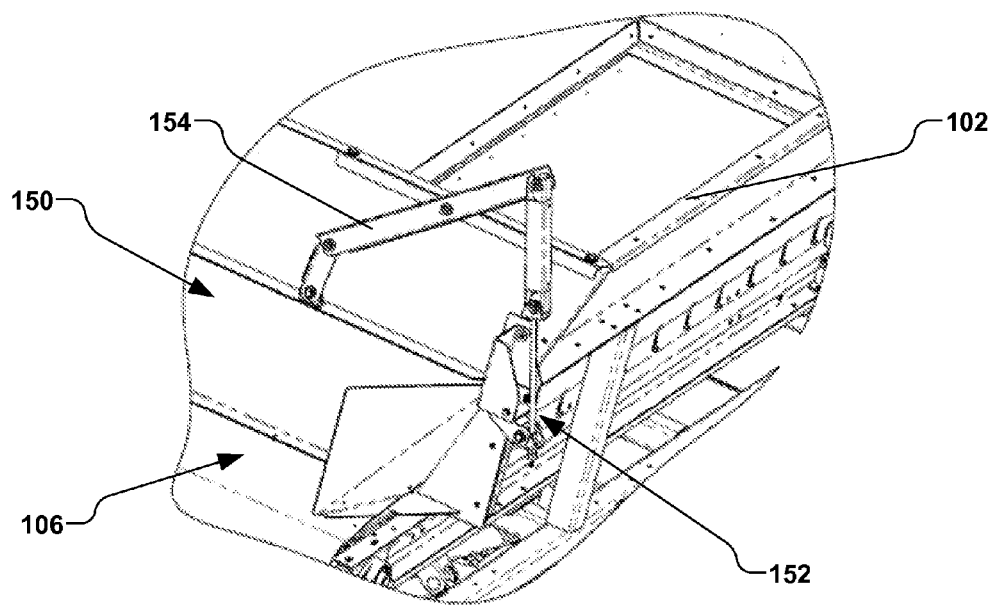
FIGS. 6-7 are perspective views of a screw-driven hinge gate associated with a hopper in accordance with still another aspect.
Figure 7:
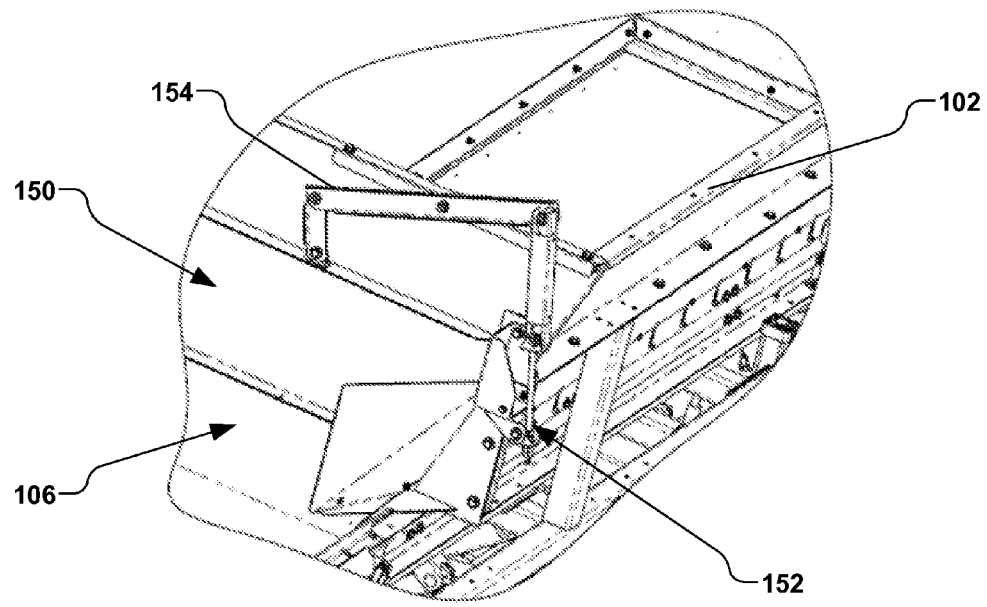

In accordance with yet another exemplary aspect of the disclosure, one or more clean-off plows 146 are illustrated in FIGS. 4 and 5, wherein the one or more clean-off plows are associated with an underside surface 148 of one or more of the support rails 124. The one or more clean-off plows 146, for example, are configured to contact the underside surface 148 of the plurality of narrow conveyor belts 114A-114D. The one or more clean-off plows 146 are thus configured to wipe residual potting material from the underside surface 148 of the plurality of narrow conveyor belts 114A-114D, therein maintaining adequate contact and tracking of the plurality of narrow conveyor belts.

According to another aspect, a discharge gate 150 is illustrated in FIGS. 1A-1B, 6, and 7, wherein the discharge gate is provided in association with the exit 106 of the hopper 102. The discharge gate 150, for example, comprises a manual screw-drive 152 illustrated in FIGS. 6-7 that is operably coupled to hinged levers 154. The manual screw-drive 152, for example, is configured to open, close, or re-position the discharge gate 150 via the hinged levers 154, therein further controlling a discharge of the potting material 104 from the exit 106 of the hopper 102.

Figure 8:
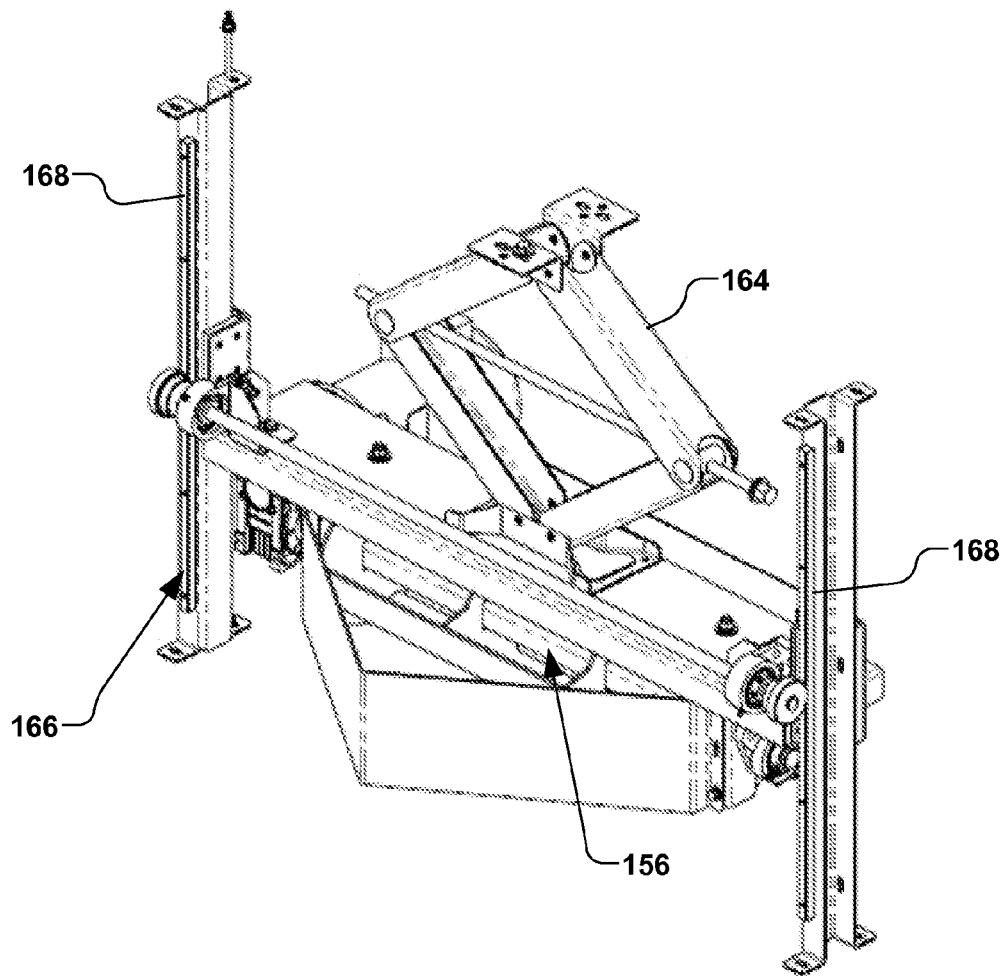
FIG. 8 is a perspective view of a material agitator associated with the container filling apparatus according to another example.

A material agitator 156 is further provided in FIG. 8, wherein the material agitator may be further associated with the plurality of narrow conveyor belts 114A-114D. The material agitator 156 (e.g., a rotary compression device) is configured to agitate the potting material 104 in the horticultural container 130 of FIGS. 1A-1B to order to induce settling and uniformity of the potting material within the horticultural container.

Figure 9:
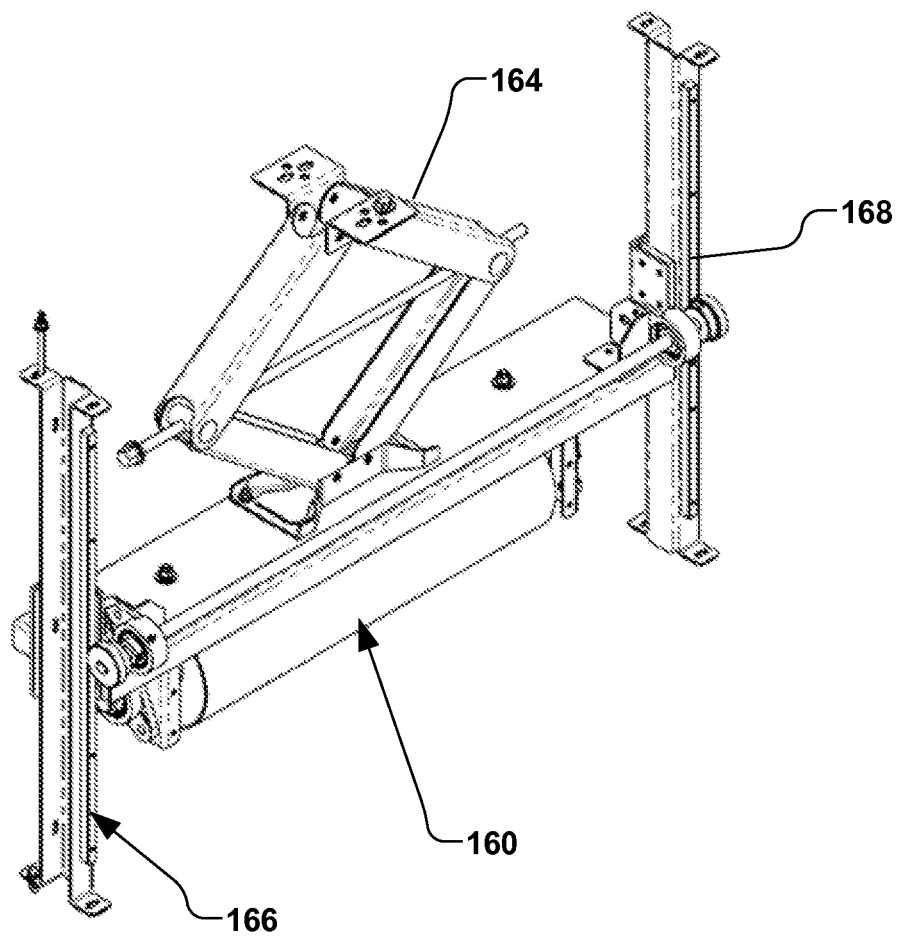
FIG. 9 is a perspective view of an exemplary compaction roller associated with the container filling apparatus.
Figure 10:
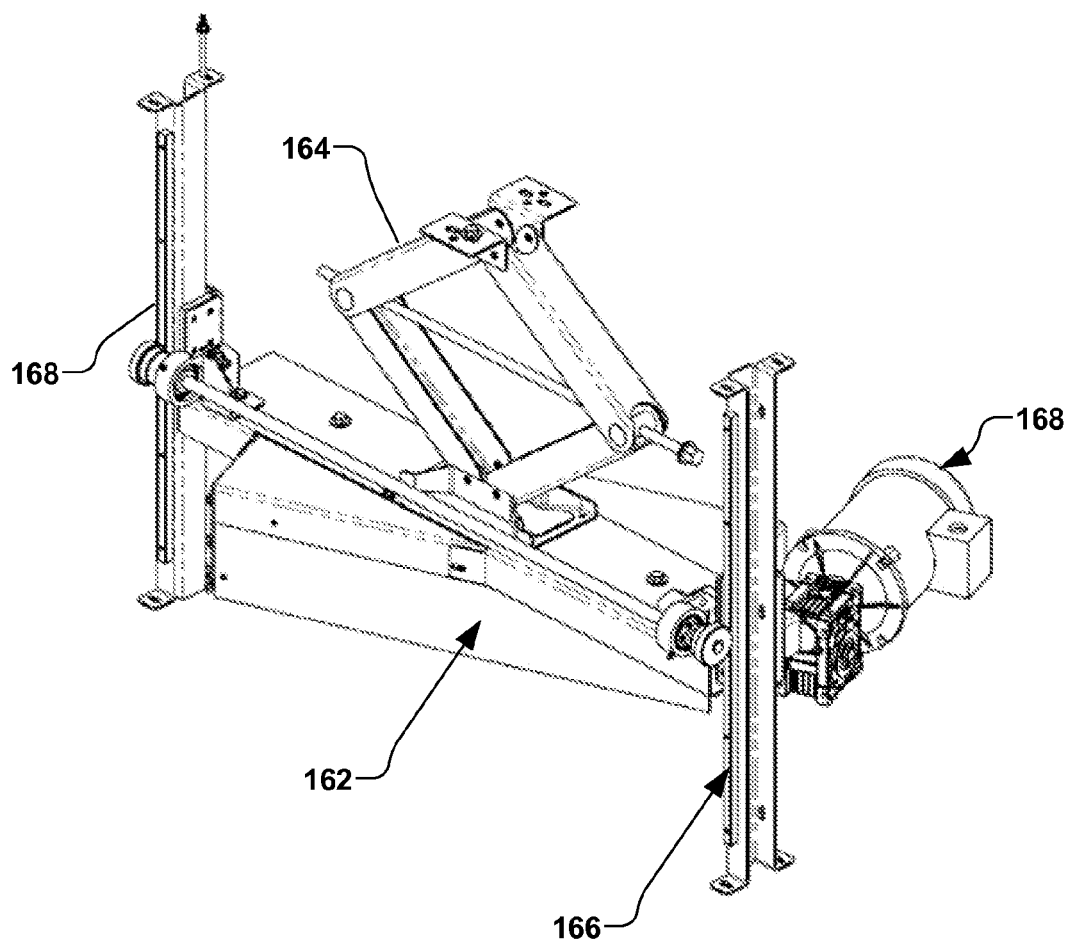
FIG. 10 is a perspective view of an exemplary powered brush associated with the container filling apparatus.

According to another exemplary aspect, one or more of a compaction roller 160 illustrated in FIG. 9 and a brush-off unit 162 illustrated in FIG. 10 may be further provided, wherein the compaction roller is positioned a first predetermined distance above the first plane 118 and is configured to provide downward pressure onto the potting material 104 deposited in the horticultural container 130 of FIGS. 1A-1B. The compaction roller 160 may be passive and free to rotate. The brush-off unit 162 of FIG. 10 may be positioned a second predetermined distance above the first plane 118, whereby the brush-off unit is configured to brush excess potting material 104 from the horticultural container 130. The brush-off 162 unit may be powered via a brush-off actuator 168 configured to forcefully brush a predetermined amount of potting material 104 from the horticultural container 130.

In accordance with another aspect of the disclosure, one or more of the material agitator 156, compaction roller 160, and brush-off unit 162 of FIGS. 8-10 (generally referred to as so-called soil conditioning units) are individually vertically adjustable. For example, one or more of the material agitator 156, compaction roller 160, and brush-off unit 162 are individually vertically adjustable via one or more scissor jacks 164 operably coupled to a position leveling apparatus 166. Strip-mounted rack gears 168, for example, may be further provided and configured to level and support the respective one or more of the material agitator 156, compaction roller 160, and brush-off unit 162. The one or more scissor jacks 164 enable easy adjustment and precise positioning of such soil conditioning units over the plurality of narrow conveyor belts 114A-114D, as filled horticultural containers pass under them. The additional position leveling rack gears 168 prevent the soil conditioning units from swaying back and forth, and assists with the precise positioning of the conditioning units. The one or more scissor jacks 164 eliminates conventional costly locking mechanisms since the scissor jack holds its position without the necessity of a lock.

Figure 11A:
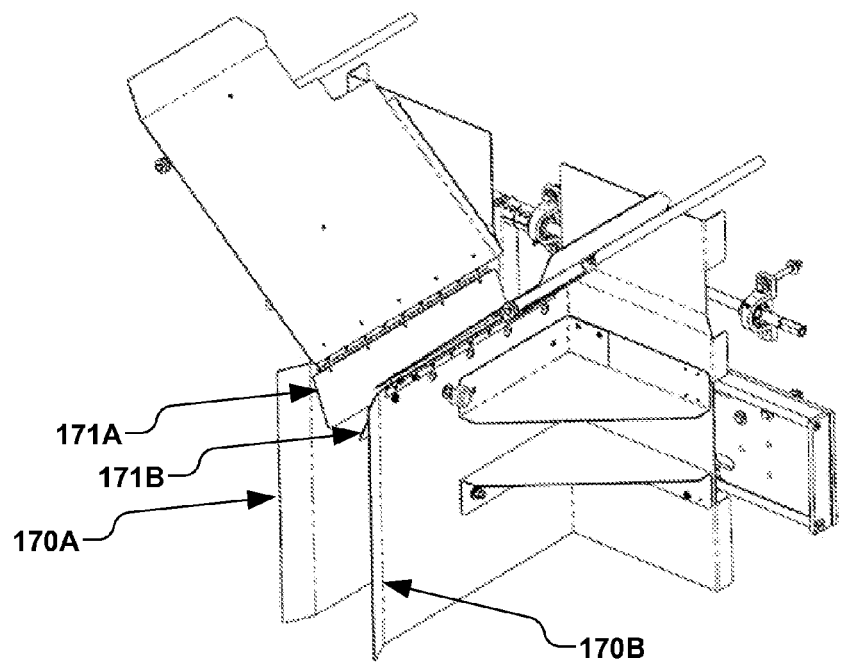
FIGS. 11A-11B are perspective views of exemplary filling plate guide wings associated with the container filling apparatus.
Figure 11B:
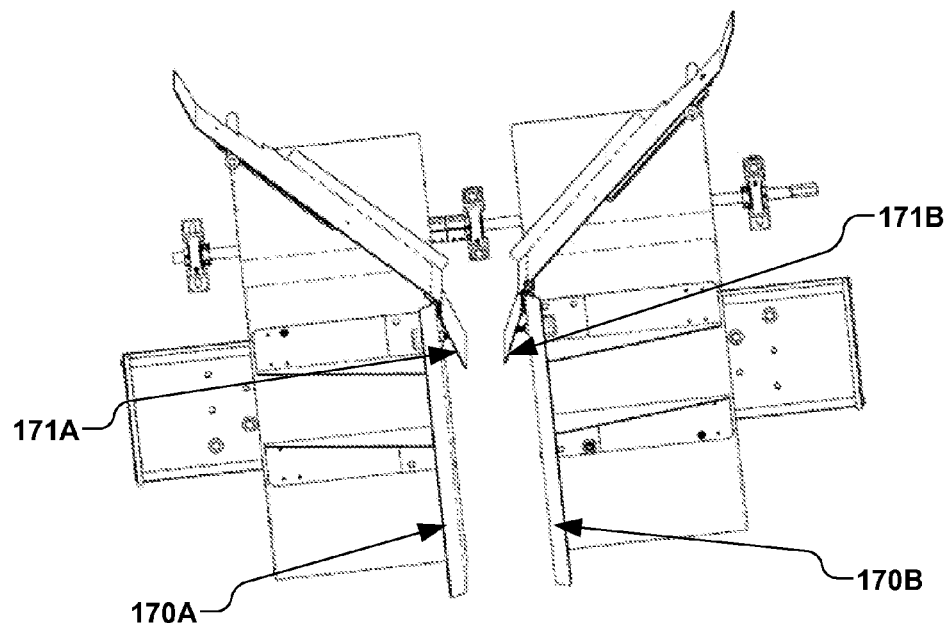
Figure 12A:
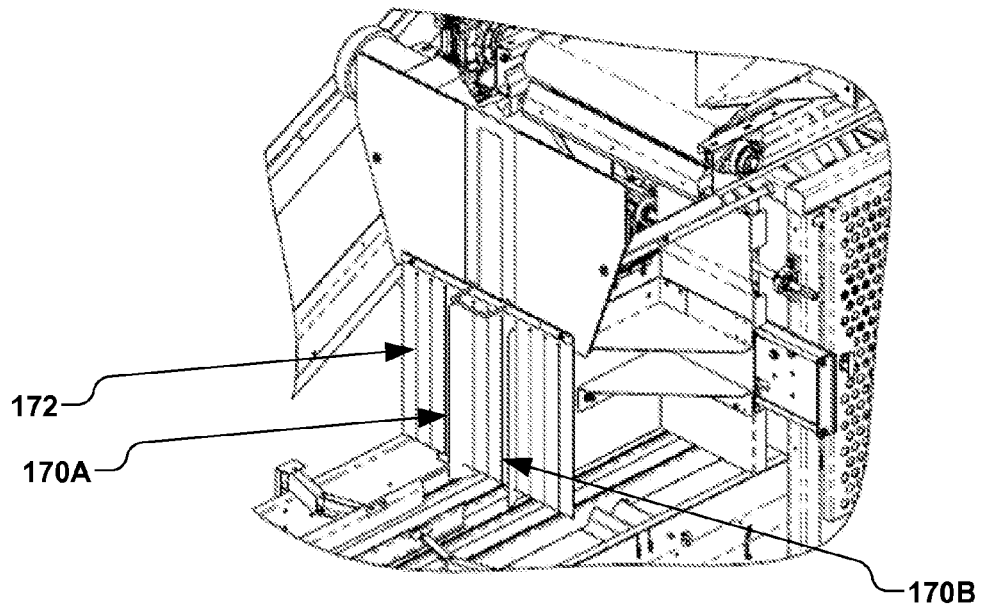
FIGS. 12A-12B are perspective views of an exemplary dust cover associated with an exit of the hopper.
Figure 12B:
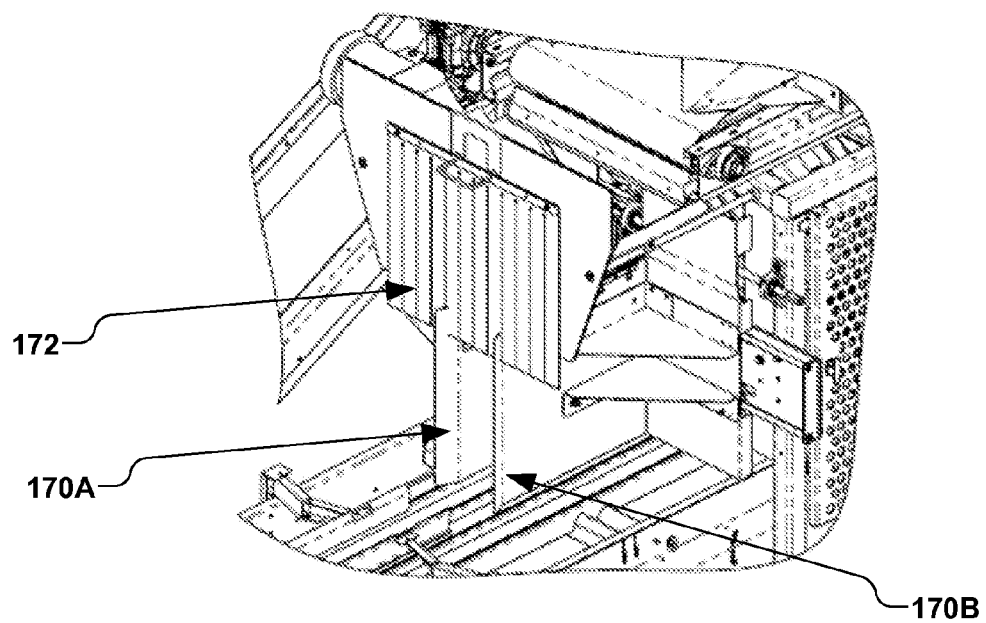

According to yet another exemplary aspect, as illustrated in FIGS. 11A-11B, first and second filling plates 170A, 170B may positioned proximate to the exit 106 of the hopper 102 of FIGS. 1A-1B, wherein the first and second filling plates are manually positionable and configured to guide the horticultural containers 130 as they are filled with potting material 104. One or more manually-adjustable hinged guide wings 171A, 171B may be mounted proximate to a mid-point of the respective first and second filling plates, wherein the one or more manually-adjustable hinged guide wings are configured to direct the potting material into the horticultural container. The first and second filling plates 170A, 170B, for example, enable the filler operator to better direct the potting material into the receiving containers (e.g., round pots), thus resulting in less excess soil being passed, and more precise filling resulting in good compaction.

A dust cover 172, illustrated in FIGS. 1A-1B and 12A-12B may be further operably coupled to a front of a filling plate area 174 associated with first and second filling plates 170A, 170B of FIGS. 11A-11B, wherein the dust cover is vertically adjustable and configured to contain potting material 104 that may become airborne. The dust cover 172, for example, may comprise a manually-adjustable plastic extension curtain, wherein the manually-adjustable plastic extension curtain is magnetically coupled to a metallic rectangular frame within a top, stationary dust cover. As such, the filler operator may manually adjust the dust cover 172 up or down, for better dust control when different size containers are being filled.

Figure 13:
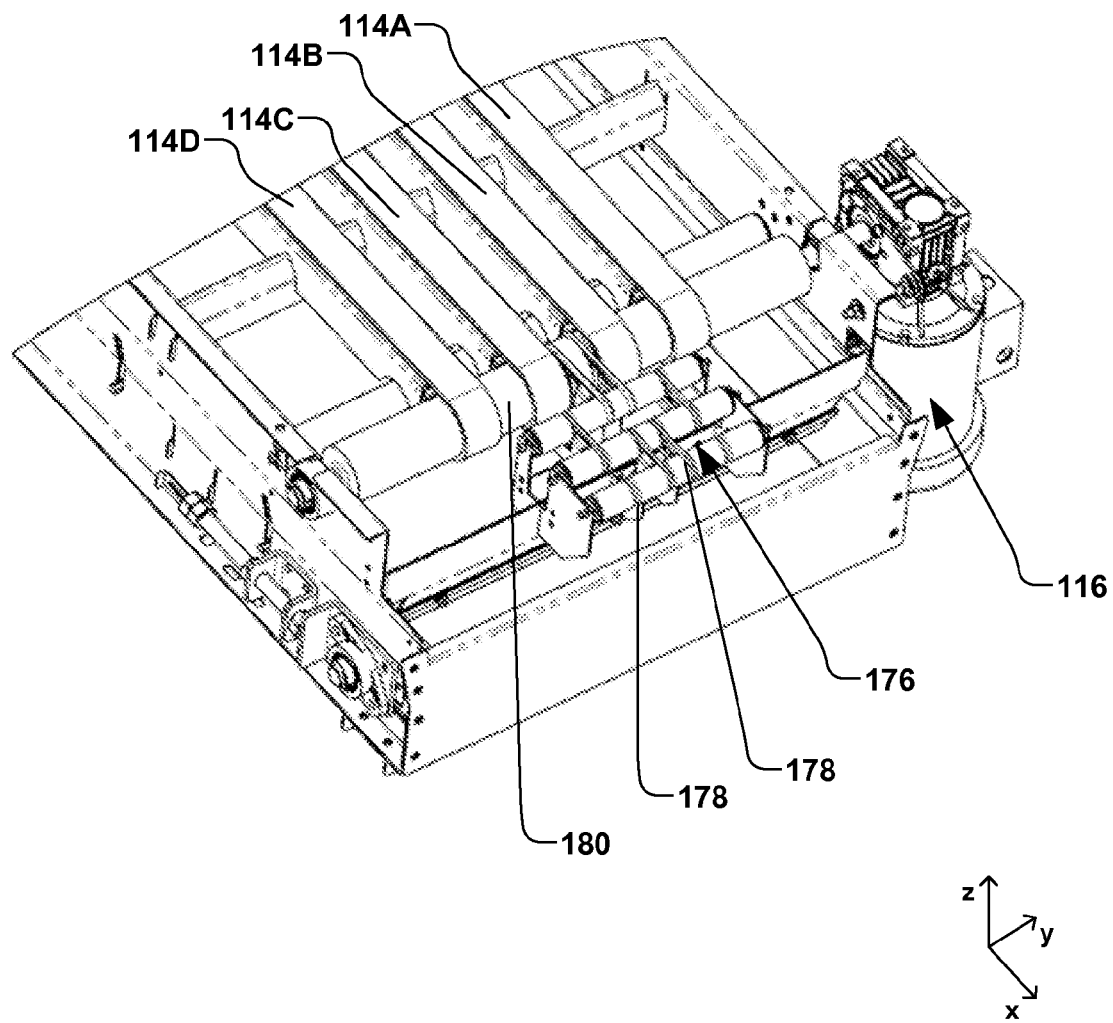
FIGS. 13-15 are perspective views of a powered transfer roller associated with the plurality of narrow conveyor belts according to another example.
Figure 14:
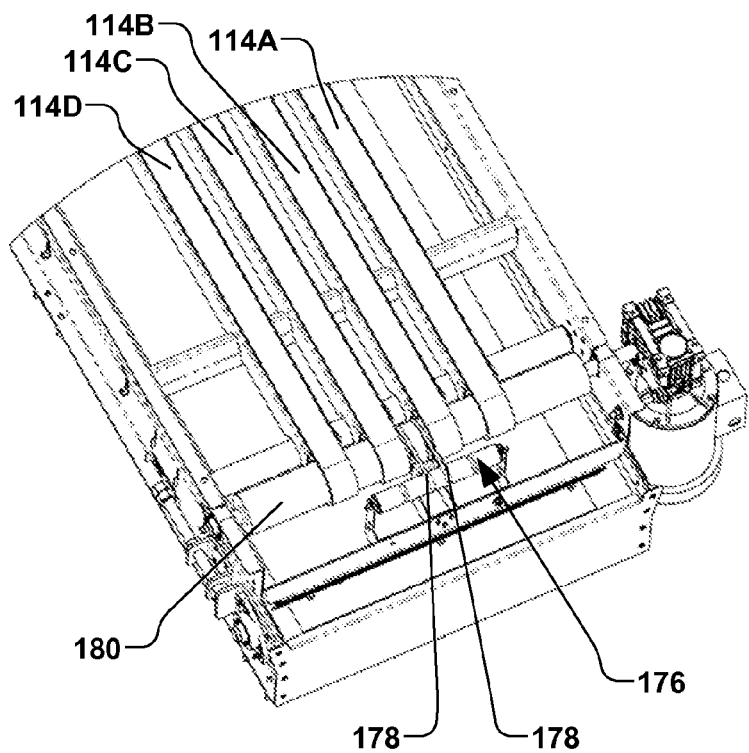
Figure 15:
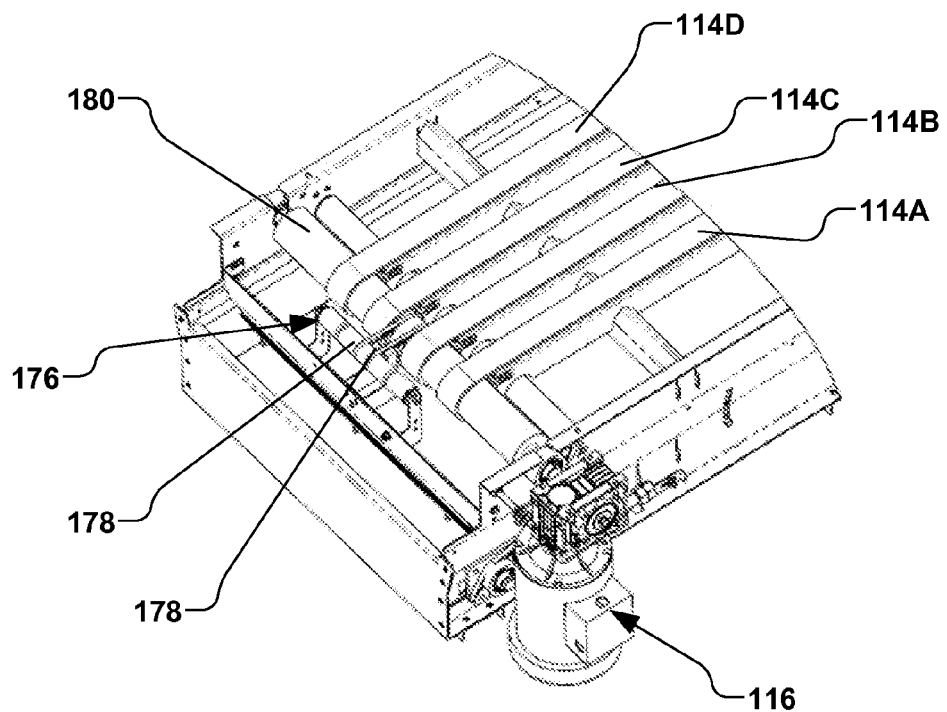

In accordance with yet another example, one or more in-direct powered transfer rollers 176 are provided and illustrated in FIGS. 13-15. The one or more in-direct powered transfer rollers 176 are powered by a belt 178 that rides in grooves on both an end roller 180 associated with the narrow conveyor belts 114A-114D and the one or more in-direct powered transfer rollers. When the narrow conveyor belts 114A-114D is operated, for example, the one or more in-direct powered transfer rollers 176 are driven by the belt 178, wherein the belt is tensioned therebetween. Any number of belts 178 can be utilized to connect additional in-direct powered transfer rollers 176 to the previous roller for larger or wider horticultural containers. In-direct powered transfer rollers 176 generally eliminate conventional bearings, gears and chains, thus simplifying operation and lowering costs, while providing a stable powered transfer platform for individual horticultural containers to the next piece of equipment in line, while also generally preventing tipping of the horticultural containers 130.

Although the disclosure has been shown and described with respect to a certain embodiment or embodiments, it should be noted that the above-described embodiments serve only as examples for implementations of some embodiments of the present disclosure, and the application of the present disclosure is not restricted to these embodiments. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the disclosure. In addition, while a particular feature of the disclosure may have been disclosed with respect to only one of several embodiments, such feature may be combined with one or more other features of the other embodiments as may be desired and advantageous for any given or particular application. Accordingly, the present disclosure is not to be limited to the above-described embodiments, but is intended to be limited only by the appended claims and equivalents thereof.

The invention claimed is:

1. A horticultural container filling apparatus, comprising:
 a hopper configured to selectively dispense potting material through an exit thereof;
 a two-tier strip conveyor assembly, comprising:
  a plurality of narrow conveyor belts operably coupled to a rotational input device, wherein the rotational input device is configured to translate the plurality of narrow conveyor belts in a first direction along a first plane in a conveying region below the exit of the hopper, wherein the plurality of narrow conveyor belts are respectively spaced a predetermined distance from one another, therein defining one or more gaps between the plurality of narrow conveyor belts;
  a plurality of support rails configured to support and guide the plurality of narrow conveyor belts along the first plane, wherein the plurality of narrow conveyor belts, in conjunction with the plurality of support rails, are configured to support and convey a horticultural container disposed thereon in the first direction in the conveying region, wherein the horticultural container is configured to receive at least a portion of the potting material dispensed from the exit of the hopper, and wherein the one or more gaps are configured to pass therethrough a remaining portion of the potting material that is not received by the horticultural container to a second plane positioned below the first plane; and a catch conveyor belt having a catch region positioned along the second plane, wherein the catch conveyor is configured to receive and translate the remaining portion of the potting material in a second direction along the second plane; and a return conveyor assembly, the return conveyor assembly comprising one or more inclined conveyor belts configured to receive the remaining portion of the potting material from the catch conveyor belt and to return the remaining portion of the potting material to the hopper, wherein the one or more inclined conveyor belts are comprised of one or more substantially flat belts, and wherein an incline angle of the one or more inclined conveyor belts is configured to generally prevent slippage of the remaining portion of the potting material.

2. The horticultural container filling apparatus of claim 1, wherein the one or more inclined conveyor belts comprise:
a first inclined conveyor belt configured to receive the remaining portion of the potting material from the catch conveyor belt and to translate the remaining portion of the potting material in a third direction transverse to the second direction; and
a second inclined conveyor belt configured to receive the remaining portion of the potting material from the first inclined conveyor belt and to translate and elevate the remaining portion of the potting material to an elevation of the hopper.

3. The horticultural container filling apparatus of claim 1, wherein one or more of the plurality of support rails comprises a slide bed top, wherein the plurality of narrow conveyor belts slidingly engage one or more of the respective plurality of support rails via the slide bed top.

4. The horticultural container filling apparatus of claim 1, wherein one or more of the plurality of support rails comprise a V-shaped groove, and wherein one or more of the plurality of narrow conveyor belts comprises a tracking strip positioned on an underside thereof, wherein the respective tracking strip is configured to slidingly engage the respective V-shaped groove.

5. The horticultural container filling apparatus of claim 1, further comprising one or more clean-off plows, wherein the one or more clean-off plows are associated with an under side of each support rail, and wherein the one or more clean-off plows are configured to contact an underside surface of the plurality of narrow conveyor belts, wherein the one or more clean-off plows are configured to wipe residual potting material from the underside surface of the plurality of narrow conveyor belts.

6. The horticultural container filling apparatus of claim 1, further comprising a material agitator associated with the plurality of narrow conveyor belts, wherein the material agitator is configured to agitate the potting material in the horticultural container to induce settling and uniformity of the potting material within the horticultural container.

7. The horticultural container filling apparatus of claim 6, further comprising one or more of a compaction roller and a brush-off unit, wherein the compaction roller is positioned a first predetermined distance above the first plane and is configured to provide downward pressure onto the potting material deposited in the horticultural container, and wherein the brush-off unit is positioned a second predetermined distance above the first plane and is configured to brush excess potting material from the horticultural container.

8. The horticultural container filling apparatus of claim 7, wherein one or more of the material agitator, compaction roller, and brush-off unit are individually vertically adjustable.

9. The horticultural container filling apparatus of claim 7, wherein one or more of the material agitator, compaction roller, and brush-off unit are individually vertically adjustable via a scissor jack operably coupled to a position leveling apparatus, wherein strip-mounted rack gears are configured to level and support the respective one or more of the material agitator, compaction roller, and brush-off unit.

10. The horticultural container filling apparatus of claim 7, wherein the compaction roller is not powered and is free to rotate.

11. The horticultural container filling apparatus of claim 7, wherein the brush-off unit comprises a brush-off actuator configured to forcefully brush a predetermined amount of potting material from the container.

12. The horticultural container filling apparatus of claim 1, wherein each of the plurality of narrow conveyor belts has a predetermined width of approximately 2 inches and a predetermined thickness of approximately one-quarter inch, and wherein the predetermined distance separating the plurality of narrow conveyor belts is approximately 2 inches.

13. The horticultural container filling apparatus of claim 1, wherein the one or more support rails are comprised of metal.

14. The horticultural container filling apparatus of claim 1, further comprising first and second filling plates positioned proximate to the exit of the hopper, wherein the first and second filling plates are manually positionable and configured to guide the horticultural containers as they are filled with potting material.

15. The horticultural container filling apparatus of claim 14, further comprising one or more manually-adjustable hinged guide wings mounted proximate to a mid-point of the respective first and second filling plates, wherein the one or more manually-adjustable hinged guide wings are configured to direct the potting material into the horticultural container.

16. The horticultural container filling apparatus of claim 14, further comprising a dust cover extension operably coupled to a front of a filling plate area associated with the first and second filling plates, wherein the dust cover is vertically adjustable and configured to maintain potting material that is airborne.

17. The horticultural container filling apparatus of claim 16, wherein the dust cover comprises a manually-adjustable plastic extension curtain, wherein the manually-adjustable plastic extension curtain is magnetically coupled to a metallic rectangular frame within a top, stationary dust cover.

18. The horticultural container filling apparatus of claim 1, further comprising a discharge gate associated with the exit of the hopper, wherein the discharge gate comprises a manual screw-drive operably coupled to hinged levers, wherein the manual screw-drive is configured to open, close, or re-position the discharge gate via the hinged levers.

19. The horticultural container filling apparatus of claim 1, wherein the plurality of narrow conveyor belts and one or more inclined conveyor belts comprise flat conveyor belts.

20. The horticultural container filling apparatus of claim 1, wherein the second direction is generally opposite the first direction.

* * * * *